Figure 1:
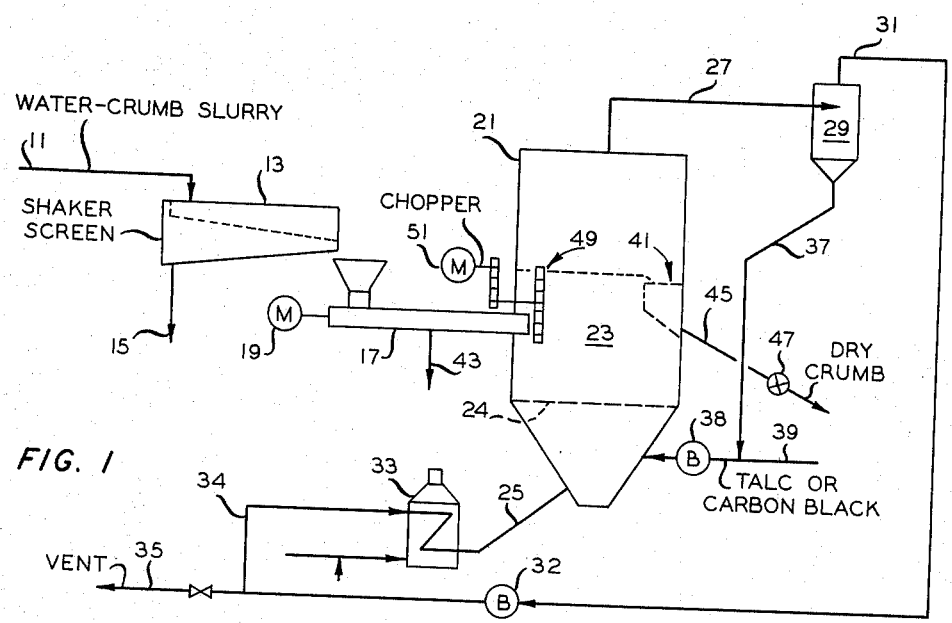

March 22, 1966 L. W. POLLOCK 3,241,246
METHOD AND APPARATUS FOR FLUID BED DRYING
OF NON-PIGMENTED RUBBER CRUMB
Filed Aug. 9, 1962

INVENTOR.
L. W. POLLOCK
BY Young & Quigg
ATTORNEYS

United States Patent Office 3,241,246
Patented Mar. 22, 1966

3,241,246
METHOD AND APPARATUS FOR FLUID BED DRYING OF NON-PIGMENTED RUBBER CRUMB
Lyle W. Pollock, Bartlesville, Okla., assignor to Phillips Petroleum Company
Filed Aug. 9, 1962, Ser. No. 215,985
11 Claims. (Cl. 34—10)

This invention relates to drying wet, non-pigmented rubber crumb. In one aspect, it relates to drying wet, non-pigmented rubber crumb in a fluidized bed dryer by superheated steam alone or with superheated steam supplemented with hot combustion flue gas.

In the production of rubber by polymerization, an aqueous slurry of rubber crumb is produced. For shipment of the rubber, and for its ultimate use, the rubber must be dry. Many compounding agents, such as fillers, pigments, accelerators, extenders, etc., are incorporated into the dry rubber, and the mixture vulcanized.

The drying of wet rubber crumb involves numerous operational steps and in some cases the operational steps are carried out only with difficuty. One difficulty when using fluid bed dryers is in the final crumb drying step when it is desired to dry the crumb to one-half percent or less moisture, on a weight basis. This difficulty is due to the tackiness of the crumb. This tackiness causes the crumb during drying to ball and to adhere to the inner portions of the drying apparatus.

One solution to the tackiness problem involves masterbatching the polymer with carbon black to produce, a rubber crumb containing well dispersed carbon black. Such pigmented crumb is dried successfully in rotary dryers without balling and adhering to the drying apparatus. In other words, crumb containing pigments, such as carbon black, or the like, is not tacky during drying.

In some instances, it is desired to produce rubber crumb not containing such loading of carbon black or other pigments as utilized in normal masterbatching. Some small amount of carbon black, or other dusting agent, such as finely divided talc, zinc oxide, other pigments, and soaps can in some cases be tolerated.

An object of this invention is to provide a method and apparatus for drying wet, non-pigmented rubber crumb. Another object of this invention is to provide a method and apparatus for drying wet, non-pigmented rubber crumb in such a manner that the crumb during drying does not ball nor adhere to the inner surfaces of the drying apparatus. Yet another object of this invention is to provide a method and apparatus, the latter being simple and relatively inexpensive to construct, maintain and operate, for drying non-pigmented rubber crumb. Other objects and advantages of this invention will be realized upon reading the following description which, taken with the attached drawing, forms a portion of this specification.

Specifically, this invention is directed to a method for drying wet, non-pigmented rubber crumb comprising passing said rubber crumb into a closed zone, passing a dusting agent into said closed zone and maintaining said rubber crumb and dusting agent in a fluidized state by introducing superheated steam thereinto thereby drying said crumb, withdrawing steam from said zone, and removing dried crumb from said zone as a product of the operation.

Furthermore, the invention relates to apparatus for carrying out the method of the invention and includes, in operable combination, a closed vessel, a centrifugal separator, a first conduit communicating the upper portion of said vessel with the inlet of said separator, a second conduit communicating one outlet of said separator with the lower portion of said vessel, means for blowing fluid in said second conduit into said vessel, a fluid outlet in communication with said second conduit, said second conduit including a heater, a third conduit communicating another outlet of said separator with the lower portion of said vessel, means for inlet of wet, non-pigmented, tacky rubber crumb and an outlet for dried crumb in said vessel, and means for inlet of a dusting agent into the lower portion of said vessel.

Figure 2:
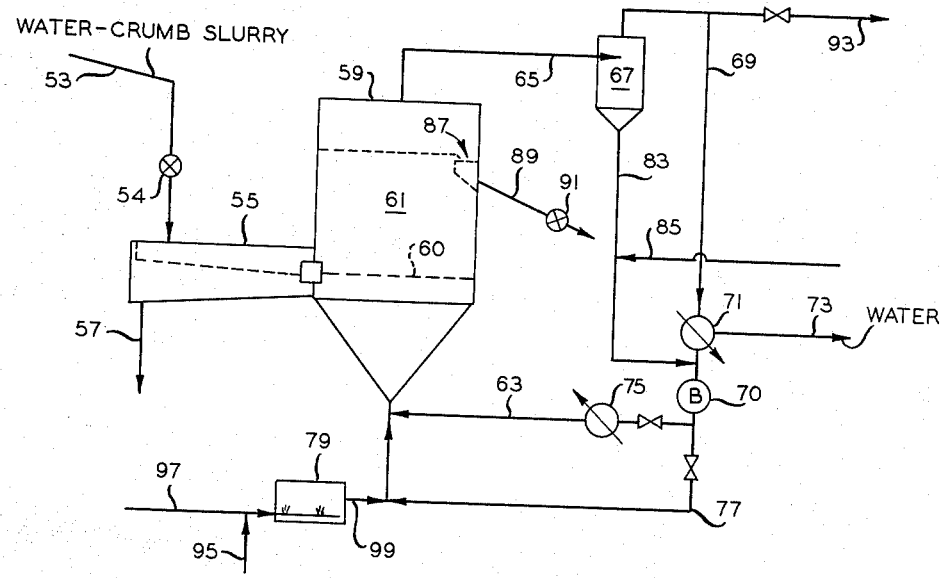

In the drawing, FIGURE 1 illustrates, in diagrammatic form, an arrangement of apparatus parts for carrying out the process of this invention. FIGURE 2 illustrates, in diagrammatic form, an alternate arrangement of apparatus parts for carrying out the process of this invention.

In FIGURE 1, reference numeral 11 identifies a conduit through which a water-rubber crumb slurry is passed from a source, not shown. From this conduit, the water-crumb slurry enters a shaker screen 13 through which most of the water passes allowing the crumb, still wet, to pass to an expeller apparatus 17. Water is withdrawn through a conduit 15 from the shaker screen for such disposal as desired. An expeller suitable for use as expeller 17 is fully described in a copending, allowed application, Serial No. 825,952, filed July 9, 1959, now U.S. Patent 3,070,836.

A motor 19 is provided in conjunction with expeller 17 for its operation. Water is withdrawn from the expeller through a conduit 43, also, for such disposal as desired. Such an expeller as described in the above-identified allowed application operates to extrude squeezed and compressed crumb rubber at its discharge end. This rubber crumb is relatively free of water but yet requires final drying in order to meet specification of one-half percent or less of water in the final crumb. Since such an extruder produces a conventional extrudate, this material must be pulverized or returned to a condition more or less equivalent in particle size to the original crumb. A chopper assembly 49 is installed and illustrated in FIGURE 1 for chopping the rubber extrudate as it issues from the expeller. A motor 51 drives the chopper. Such a chopper as chopper 49 driven by motor 51 is also fully described in the above-mentioned patent.

The chopping wheel of the chopper and the outlet end of the expeller are positioned within a closed vessel 21, which is the final drying vessel. Positioned across the vessel and at a relatively low level therein, is a distributor plate 24. This distributor plate is perforated in such a manner as to distribute gases or vapors introduced below the plate throughout the entire cross section of the vessel. A conduit 27 communicates at one end with the upper portion of vessel 21 and leads to the inlet of a centrifugal or cyclone separator 29. From the upper central portion of this centrifugal separator, a conduit 31 leads by way of a blower 32 to a heater 33. From heater 33, a conduit 25 leads to the lower portion of vessel 21 for inlet of heated gas. Heater 33 is provided for heating moisture previously separated as steam from the crumb in vessel 21 and issuing from the centrifugal separator through conduit 31, to such a superheat temperature that upon introduction into vessel 21 residual moisture contained in the chopped crumb is vaporized. The flow of this superheated steam is such as to maintain the chopped crumb as a fluidized bed 23.

Dry crumb is removed from the top of the fluidized bed 23 at the opposite side of vessel 21 from which the chopper 49 is positioned. The dried crumb is flowed into a baffle assembly 41 and is withdrawn through a conduit 45. A star-valve 47 regulates the rate of withdrawal of the dry crumb through conduit 45.

In most cases, gases from the top of vessel 21 passing through conduit 27 are steam with a portion of its superheat removed in evaporating the moisture from the chopped crumb and since the velocity of the steam flowing through this conduit is relatively high some small amount of very finely divided rubber crumb and free talc is entrained therein. Because of this entrainment, the steam and entrained talc and crumb enter the cyclone separator or other separating means for their separation and recovery. The cyclone separator is a conventional piece of equipment and is found to be quite satisfactory for the problem at hand. Steam free of entrained rubber crumb issues from separator 29 through conduit 31 under the influence of blower 32 and the blown steam is passed at least in part on through a conduit 34 into the heater 33. This heater 33 reheats the steam for passage through conduit 25 for evaporation of further moisture from crumb. Since the recirculating steam increases in volume by the amount of water evaporated from the crumb, it is necessary to remove this portion of the steam either continuously or intermittently through a conduit 35.

Because, as mentioned hereinbefore, non-pigmented rubber crumb tends to ball, to agglomerate and to stick to surfaces of equipment exposed thereto, a dusting agent such as carbon black, talc, zinc stearate, rice flour, chalk, magnesium oxide, infusorial earth, etc., is introduced into the drier 21 through a conduit 39 by a blower 38. This dusting agent is also introduced into the vessel 21 at a level below that of the distributor plate 24. The carbon black, talc, etc., being introduced at this level into the vessel 21 is suspended in the superheated steam and the two materials then pass upwardly through the perforations in plate 24. Since the rubber crumb is tacky, the dusting agent adheres rapidly to the surface of the crumb thereby neutralizing the tackiness thereof. This dusting agent adhering to the surface of the rubber crumb permits the crumb to flow freely and the dried crumb with its coating of dusting agent is thus flowed into the box assembly outlet 41 for passage through conduit 45 as product of the operation.

The separated finely divided rubber crumb and free dusting agent from centrifugal separator 29 is withdrawn from the bottom thereof and passed through a conduit 37 and is added to additional dusting agent entering blower 38 from conduit 39.

In the example illustrated in FIGURE 2 of the drawing, the main portion of the system is more or less similar to that illustrated in FIGURE 1 but the apparatus of FIGURE 2 does not include an expeller or chopper. In FIGURE 2, the water-crumb slurry enters the system by way of a conduit 53 and the flow in which is regulated by a star-valve 54. The slurry passing star-valve 54 is introduced onto the screen of shaker screen 55. This shaker screen can be similar to shaker screen 13 of FIGURE 1. A conduit 57 is provided for outlet of water from this screening apparatus. Solid materials collected on shaker screen 55 are passed from left to right and thereby enter a drying vessel 59 at about the level of the surface of a distributor plate 60. This distributor plate is also perforated for the same reason as was distributor plate 24. Reference numeral 61 identifies a fluidized crumb bed through which hot gases flow while vaporizing moisture from the surface of the crumb. Hot gases containing moisture, finely divided crumb and excess dusting agent leave the upper portion of vessel 59 through a conduit 65 and are introduced into a centrifugal separator 67. Outlet gases, free of crumb, leave separator 67 through a conduit 69 and enter a condenser 71. This condenser is operated in such a manner as to condense a portion of the water vapor contained in the outlet gases from a dryer vessel 59. This condenser 71 includes not only heat exchange surface but a liquid water separator and the separated water is withdrawn therefrom through a conduit 73. The uncondensed vapor or steam and other gases pass on from the condenser and separator to a blower 70 which forces the gases through a heater 75 and conduit 63 for re-entry into the drier vessel 59. The heating imparted to these gases or vapors by heater 75 is such as to reheat the gases to such a superheat temperature that they will vaporize substantially all the water entering the drier with the crumb from the shaker screen 55.

The finely divided crumb and free dusting agent separated in the centrifugal separator 67 pass therefrom through a conduit 83 and enter the main gas stream between condenser 71 and blower 70 for return to the system for recovery of this crumb and dusting agent. The dusting powder, such as finely divided talc or carbon black, is introduced to the system of FIGURE 2 through a conduit 85 and enters the conduit 83 through which is passing the recovered finely divided crumb from the separator 67.

In an alternate embodiment of FIGURE 2, the valve in conduit 63 is closed and the valves in conduit 77 are open so that the gases, recovered finely divided crumb and dusting agent pass through conduit 77 into the lower portion of the drier 59. In this embodiment, an additional gas for drying purposes is provided by burning a fuel from conduit 97 with air from conduit 95 in a burner assembly 79 and passing the hot flue gases through conduit 99 into conduit 77 and thence to the lower portion of drier 59. Since burner 79 produces non-condensible gases principally, then a vent conduit 93 is provided for bleeding off such a portion thereof which is approximately equivalent to that being produced in the burner 79 plus the water vapor evaporated in the drier.

Dried crumb from bed 61 is passed from the top thereof into the open top box assembly 87 for passage through a conduit 89. The flow of the dried crumb through conduit 89 is regulated by a star valve 91.

Since at least a low pressure differential is required to produce flow of gases and materials entering drier vessel 59 through conduits 77 or 63 to maintain the crumb in vessel 59 in a fluidized condition, valves 54 and 91 serve to help prevent leakage of gas from the drier vessel when the system is operated at super-atmospheric pressures. It is noted that the wet rubber crumb from the shaker screen 55 enters the drier vessel at about the level of the perforate plate 60. This position or level of the entry of the crumb is made possible by maintenance of the crumb in a fluidized bed in the drying vessel.

While I have hereinabove mentioned use of star valves 47, 54 and 91 for pressure maintenance, the use of such valves for this purpose is not essential when the systems are operated at substantially atmospheric pressure. In such a case the box assemblies 41 and 87 serve as level controls. In FIGURE 2, a star or other suitable valve 54 should be employed to prevent pressure from the lower portion of bed 61 from backing up conduit 53 by way of the shaker screen 55.

*Specific example*

As a specific example of the operation of this invention, a water-rubber crumb slurry containing about 50 percent by weight rubber is fed through conduit 11 at a rubber crumb flow rate of 1,000 pounds per hour onto a shaker screen similar to shaker screen 13. The crumb, freed of some of the water, enters the expeller 17, wherein additional water is removed, and is extruded therefrom, is chopped by chopper 49 and is dried in drier 21. The extrudate crumb as chopped by chopper 49 contains about 12 percent by weight of water. Superheated steam at a temperature of about 350° F. is passed through conduit 25 into the drier and maintains the chopped crumb in a fluidized condition thereby drying nearly all of the moisture therefrom. Carbon black is fed to the system through conduit 39 by blower 38 at a rate of about 10 pounds of carbon black per hour. This carbon black readily adheres to the tacky surface of the crumb particles thereby rendering the crumb particles nontacky and free flowing. Dried crumb particles enter the baffle separator 41 and are removed through conduit 45. This dried crumb issuing from drier 21 contains about 0.4 percent of moisture by weight.

The dusting agent employed herein is used ordinarily in an amount from about 0.1 percent to about 5 percent by weight based on the rubber crumb. More than 5 percent or even less than 0.1 percent is used depending upon the amount required to produce free flowing crumb.

While certain embodiments of the invention have been described for illustrative purposes, the invention obviously is not limited thereto.

I claim:

1. A method for drying wet non-pigmented particulate rubber crumb comprising passing said rubber crumb into a closed zone, separately passing a dusting agent into said closed zone from below the hereinafter named bed and maintaining said rubber crumb and dusting agent in a fluidized bed therein by passing superheated steam upwardly thru said bed so as to coat said crumb with said agent and remove substantially all of the moisture from said crumb, withdrawing steam from said zone, and removing coated and dried crumb from said zone as the product of the operation.

2. A method for drying wet, tacky, non-pigmented, particulate rubber crumb top roduce dry, non-tacky crumb comprising the steps of:
   (1) separately passing first said crumb and a dusting agent into a fluidized-bed drying chamber;
   (2) maintaining a fluidized bed of said crumb and dusting agent in a lower section of said chamber by introducing superheated steam upwardly thru said chamber at fluidizing velocity thereby coating said crumb and drying same to a moisture content not in excess of 0.5 weight percent;
   (3) withdrawing effluent gas from an upper section of said chamber substantially above the top of said bed; and
   (4) withdrawing dried and coated rubber crumb from an upper section of said bed.

3. The process of claim 2 wherein said dusting agent is carbon black.

4. The process of claim 2 wherein said dusting agent is powdered talc.

5. A process for drying wet, tacky, non-pigmented rubber crumb for the production of dry, non-tacky crumb comprising introducing a dusting agent into a closed zone, introducing said wet, tacky, non-pigmented rubber crumb into said zone, maintaining said crumb in a fluidized condition by introducing superheated steam and flue gas into said crumb in said zone thereby drying said crumb and coating said crumb with said dusting agent, withdrawing steam and finely divided crumb from said zone at a level above the fluidized crumb, separating by centrifugal action said finely divided crumb from the withdrawn steam, returning the separated finely divided crumb to said zone, condensing a portion of the effluent stream from the centrifugal step, withdrawing the condensate from the operation, superheating the uncondensed steam and returning it to said zone as the first mentioned superheated steam, and withdrawing dried, dusting agent coated, non-tacky crumb from said zone as the main product of the operation.

6. The process of claim 5 wherein said dusting agent is carbon black.

7. The process of claim 5 wherein said dusting agent is powdered talc.

8. The method of claim 2 wherein flue gas is admixed with the steam in step (2).

9. The process of claim 5 wherein flue gas is admixed with the steam passed to said zone.

10. Apparatus for drying particulate tacky solids, comprising in combination:
    (1) a closed upright drying vessel having
        (a) a fluid distributor plate in a generally horizontal position across its lower section,
        (b) an inlet for wet, particulate solids above said plate,
        (c) an outlet for gas in its top section,
        (d) an inlet for fluidizing and drying gas below said plate,
        (e) an inlet for a dusting agent below said plate; and
        (f) an outlet for dried coated solids in its mid-section;
    (2) a cyclone separator having
        (a) an inlet for fluid in a mid-section,
        (b) an outlet for gas in an upper section,
        (e) an outlet for solids in its bottom section;
    (3) a first conduit connecting outlet (1)(c) with inlet (2)(a); and
    (4) a second conduit connecting the outlet (2)(e) with the inlet (1)(e).

11. The apparatus of claim 10 including:
    (5) a third conduit connecting the outlet (2)(b) with the inlet (1)(d); and
    (6) means for heating the gas in said third conduit communicating therewith.

References Cited by the Examiner

UNITED STATES PATENTS

| 2,482,187 | 9/1949 | Johnson | 34—10 |
| 2,665,568 | 1/1954 | Meyer | 34—9 |
| 2,843,942 | 7/1958 | Whitsel | 34—57 |
| 2,879,173 | 3/1959 | Yacoe | 117—100 |
| 3,001,228 | 9/1961 | Mack | 117—100 |
| 3,044,179 | 7/1962 | Chapman | 34—9 |

WILLIAM F. O'DEA, *Primary Examiner.*

NORMAN YUDKOFF, *Examiner.*